Dec. 29, 1970  KIYOSHI INOUE  3,551,310
GAS-PRESSURE GATE ARRANGEMENT FOR ELECTROCHEMICAL MACHINING
Filed June 10, 1968
4 Sheets-Sheet 1

FIG.1-A  PRIOR ART

INVENTOR.
KIYOSHI INOUE
BY
Karl F. Ross
ATTORNEY

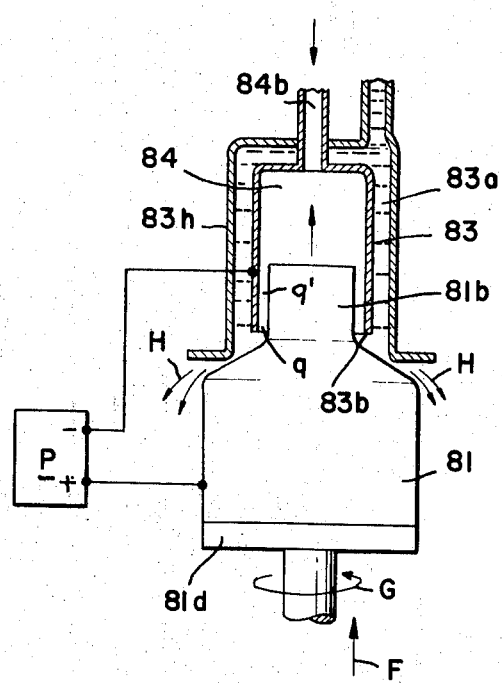
FIG.8
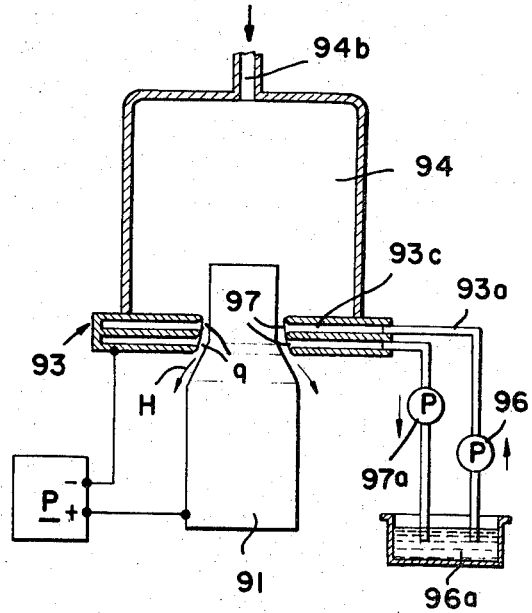
FIG.9
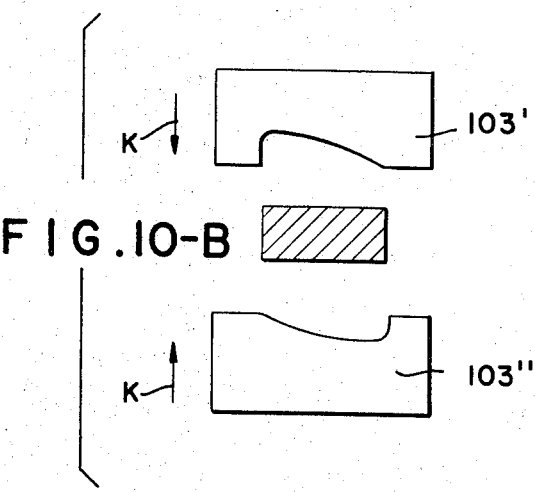
FIG.10-B
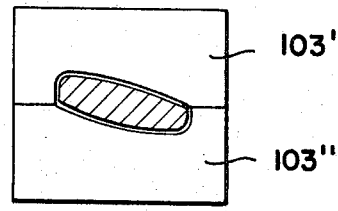
FIG.10-D

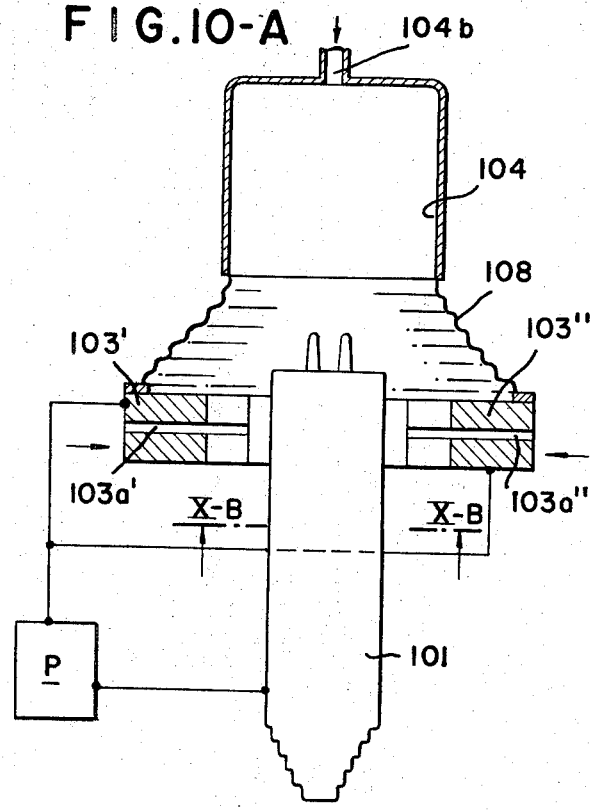
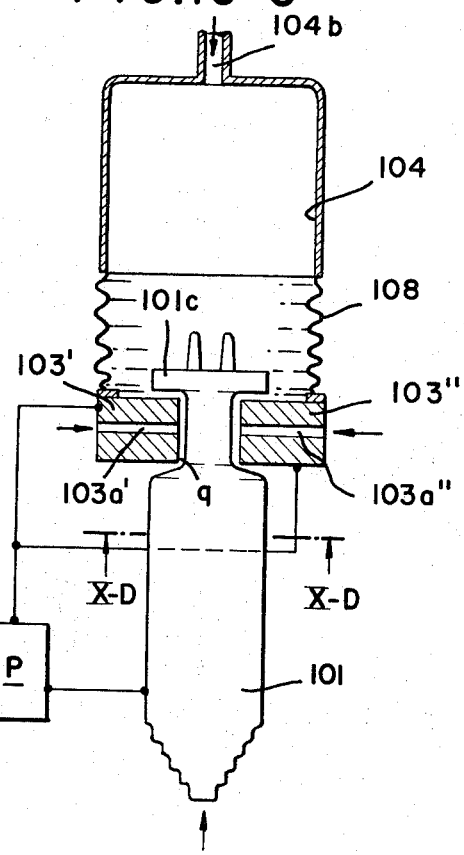
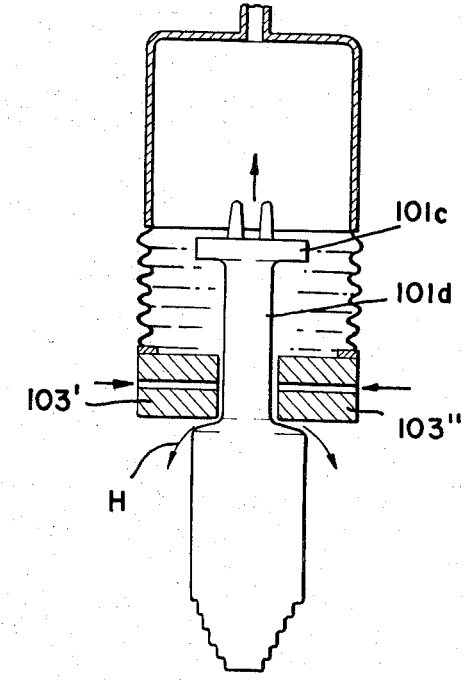
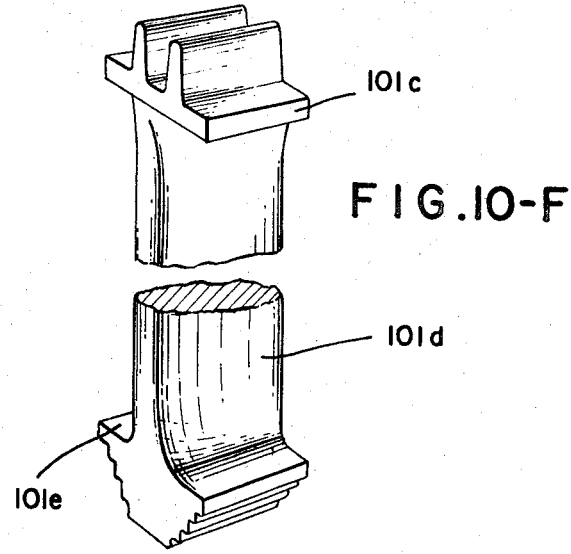

United States Patent Office 3,551,310
Patented Dec. 29, 1970

3,551,310
GAS-PRESSURE GATE ARRANGEMENT FOR
ELECTROCHEMICAL MACHINING
Kiyoshi Inoue, 16–8, 3-chome, Kamiyoga, Setagaya-ku,
Tokyo, Japan
Filed June 10, 1968, Ser. No. 735,605
Claims priority, application Japan, Oct. 4, 1967,
42/63,959, 42/63,960; Oct. 28, 1967, 42/69,239
Int. Cl. B23p 1/00
U.S. Cl. 204—143                                16 Claims

ABSTRACT OF THE DISCLOSURE

A gas-pressure gate for the electrochemical machining of annular workpiece surfaces in which electrolyte is supplied to the annular gap between an electrode and a workpiece while an electrolytic machining current erodes the workpiece material into the electrolyte; gas pressure ahead of the electrode excludes electrolyte from the region of the workpiece which has previously been machined to prevent overcutting.

---

My present invention relates to the electrochemical machining of metallic workpieces and, more particularly, to an arrangement for preventing overcutting of the workpiece during electrochemical-machining removal of material from such workpieces.

In my applications Ser. No. 475,375 filed July 28, 1965, Ser. No. 511,827 filed Dec. 6, 1965 and Ser. No. 714,251 filed Mar. 19, 1968, I have described various techniques in ECM (electrochemical machining) apparatus and methods whereby workpiece material is removed in an electrolyte by the passage of an electrolysis current between the workpiece and the electrode, the workpiece material being electrolytically solubilized during this process and being carried away by the moving electrolyte. Thus in application Ser. No. 475,375, which was a further development of processes described in application Ser. No. 356,713, now Pat. No. 3,378,473, there is shown a system wherein a workpiece and an electrode are spacedly juxtaposed while an electrolyte is passed through the gap between them and an electrolytic-erosion current flows through the gap to remove material from the workpieces. This current has a strong unidirectional or D.C. component and serves to bring the workpiece material, in the region of the workpiece juxtaposed with the electrode, into solution in the electrolyte. That application points out that, in electrolytic machining, it is difficult to limit the lateral erosion of the workpiece since the electrolyte forms a bridge between the electrode and the workpiece both in the region in which machining is intended and in regions in which machining should have been completed. It has, therefore, been proposed to mask the electrode beyond the machined zones with nonconductive materials (see the latest of my applications mentioned earlier) or to provide a nonconductive or limitedly conductive sheath or layer lining the workpiece surface to be treated. The system of my application Ser. No. 475,375 thus provides for in situ formation of a masking layer, by chemical reaction in the electrolyte, along previously machined portions and provides for a spark discharge in the intended machining regions to remove that layer and permit continued ECM.

Thus it is possible to severely restrict undesired ECM and limit overcutting as the workpiece and the electrode move relatively to one another. While the aforedescribed technique has been found to be effective in the sinking of cavities, it has not proved to be technologically as effective in the machining of workpiece surfaces in which the relative movement of the workpiece and the electrode is parallel to the surface to be treated or in which the hole or cavity is not blind. In such cases, the electrolyte sweeping through the gap is carried away toward the unmachined surface and cannot form an adequate sheath over the previously machined regions. Others have proposed the relative displacement of workpiece and electrode using tubular electrode structures designed to eject the electrolyte generally in the radial direction and have even provided means for drawing off the electrolyte close to the region at which it is injecting into the gap to limit such overcutting. This too has not been found to be wholly effective.

It is, therefore, the principal object of the present invention to provide an improved method of electrochemically machining a metallic workpiece in which the aforementioned disadvantages can be avoided and machining can be carried out with minimum overcutting of the previously machined surface.

Another object of this invention is to provide an apparatus for electrochemically machining a metallic workpiece wherein the machining action can be limited to restricted regions of the workpiece.

Still another object of my present invention is to provide improved apparatus for the controlled ECM of pilot bores and passages and other annular workpiece regions so as to impart to the workpiece the desired configuration with accurate dimensions.

Still another object of the instant invention is to provide an improved appaartus for the ECM of elongated bodies, i.e. an improved ECM lathe.

These objects are attained, in accordance with the present invention, by providing behind the source of electrolyte in the direction of travel of the electrode, i.e. in the machining direction, a head of gas pressure tending to drive the electrolyte forwardly in the direction of the unmachined portions of the workpiece, thereby forming a pressure gate behind the electrolyte-input orifice. The orifice is, according to this invention, part of the electrode structure which is displaceable longitudinally of the area to be machined.

According to a more specific feature of this invention, the electrode is a body receivable in a pilot hole formed in a workpiece, the interior surface of which is to be machined. At a machining zone of this electrode, one or more radial orifices and/or an annular orifice discharge electrolyte radially outwardly against the internal surface of the pilot hole while the electrode is advanced in the direction of the unmachined portion of this wall. The gas-pressure gate of this invention thus comprises a chamber communicating with the hole at the machine side of the latter, i.e. behind the electrode, and maintained at a pressure level at least equal to the pressure of the electrolyte in this gap so as to drive the electrolyte forwardly as the electrode advances. Preferably, the electrode is of piston-like or disk construction so as to subdivide the gas-pressure chamber behind this electrode from the machining zone coplanar with and ahead of the electrode. Furthermore, I prefer to provide means for rotating the electrode at least in the region of its radial discharge orifices so as to ensure homogeneous machining throughout the annular zone juxtaposed with the electrode regions proximal to the disk.

According to another aspect of this invention, an external annular surface is machined by means of an annular electrode surrounding the workpiece and having electrolyte-discharge orifices directed radially inwardly against the workpiece, the electrode or the workpiece being rotated so as to uniformly distribute the machining action and constitute of the system an electrochemical machining lathe. A chamber is defined with the electrode at the machined side of the workpiece for delivering the aforementioned gas pressure and forcing the electrolyte in the direction of the unmachined workpiece portion. In addition, the electrolyte may be withdrawn from the region of the workpiece surface just behind the machining zone and/or the gas pressure gap can be constituted of a gas-pressure annulus created by the introduction of gas between the workpiece and the electrode just behing the machining area. In this case, electrolyte circulation is achieved by advancing the electrode through a chamber filled with the electrolyte and into which the unmachined region of the workpiece extends.

According to still another feature of this invention, the electrode structure is composed of a plurality of electrode portions which are fed radially inwardly against the workpiece with electrochemical machining being carried out during the radial advance until the desired cross-section and dimensions are obtained in this region. Thereafter, relative axial displacement of the workpiece and the electrode can be carried out to machine the workpiece to a corresponding cross-section and dimension along all or part of its length. It has been found that this method is particularly desirable for the formation of turbine blades and other objects of relatively complex configuration. The electrochemical machining parameters and electrolyte composition are generally identical to those used in previous electrochemical machining operations as set forth, for example, in my copending applications mentioned earlier.

The above and other objects, features and advantages of the present invention will become more readily apparent from the following description, reference being made to the accompanying drawing in which:

FIG. 1A is a diagrammatic detail view, further elucidating the prior-art construction;

FIGS. 8 and 9 are axial cross-sectional views of electrochemical machining systems using annular gas pressure gates;

FIG. 10A is a diagrammatic vertical cross-sectional view of another machining system in one operating position thereof;

FIG. 10B is a cross-sectional view along the line XB—XB thereof;

FIG. 10C is a view similar to FIG. 10A showing the parts in another position;

FIG. 10D is a cross-section along the line XD—XD;

FIG. 10E is a view similar to FIG. 10A showing the parts in another operative position; and FIG. 10F is a perspective view of the completed product made by the device of FIGS. 10A–10E.

Figure 1:
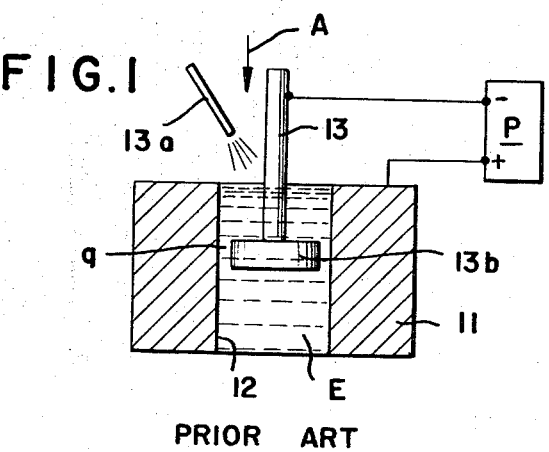
FIG. 1 is an axial cross-sectional view through a system for the machining of an internal surface of a workpiece according to prior-art systems and is presented for comparison purposes only.

In FIGS. 1 and 1A, I have shown a system which can be considered representative of the prior art in the electrochemical machining of the internal surface 12 of a pilot hole formed in a workpiece 11. Electrolyte is delivered to the surface 12 to be machined, e.g. as represented by the tube 13a while the electrode 13 is advanced axially (arrow A) by any of the control mechanisms described, for example, in application Ser. No. 475,375 and the other copending applications mentioned earlier. An electrochemical machining-power supply, represented at P, is connected across the workpiece 11 and the electrode 13 so that the workpiece is poled relatively positive and the electrode is poled relatively negative. A machining gap $q$ is formed between the workpiece 12 and the machining portion 13b of the electrode 13, here shown to be of a piston configuration and to have a disk-shaped machining portion.

Referring now to FIG. 1A, it can be seen that while the desired machining zone is represented at $l_1$ and consists of the axial zone immediately juxtaposed with the machining surface 13b of the electrode 13, the actual machining zone, as determined by the ionic current flow (dot-dash lines in FIG. 1A) can be represented by the zone $l_2$. The region $l_3$, behind the electrode 13, is thus overcut, this overcutting requiring highly precise control of the speed of the electrode, any electrolyte flow rate and the electrical parameters of the machining operation, if overcutting is not to extend beyond the desired tolerances. As a practical matter, it is almost impossible to prevent some overcutting in the zone $l_3$ which, depending upon the width $w$ of the gap $q$ and the condition of the electrolyte E, may be of relatively considerable or small axial extent.

Figure 2:
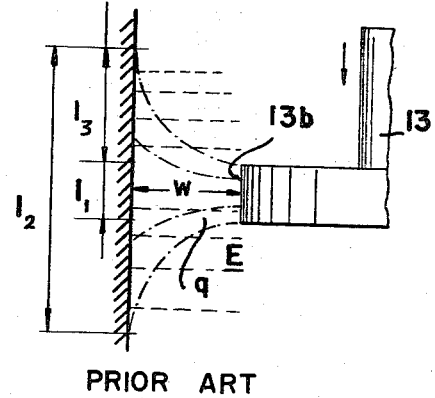
FIG. 2 is a diagram similar to FIG. 1A but illustrating principles of the present invention, the machining gap being exaggerated.
Figure 2:
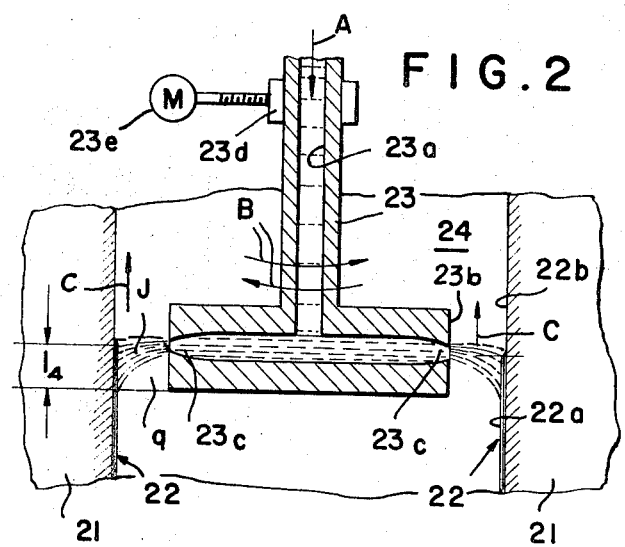

In accordance with the principles of the present invention, illustrated diagrammatically in FIG. 2, the electrode 23, which can be advanced axially in the direction of arrow A into the workpiece 21 to machine the surface 22, has a central passage 23a through which the electrolyte is pumped (see U.S. patent application Ser. No. 475,375) to deliver electrolyte to a multiplicity of radial orifices or passages 23c formed along the machining face 23b or disk part of the electrode, the electrolyte being discharged in radial jets J. The electrode 23 may be angularly oscillated (arrow B) to an angular extent greater than the angular separation of the orifices 23c or can be rotated by a worm-gear transmission 23d driven by motor 23e to sweep the jet J uniformly over the desired machining zone $l_4$ as illustrated in FIG. 2. The unmachined region of the surface 22 is represented at 22a while the previously machined surface is designated at 22b. Behind the machining portion 23b of the electrode 23, I provide a chamber 24 which is maintained at a gas pressure at least equal to the electrolyte pressure at the gap $q$ to prevent any electrolyte flow in the direction of arrow C and, indeed, to force electrolyte to flow in the direction of advance of the electrode (arrow A). The region behind the electrode is thus a gas pressure gate confining the machining region to the zone $l_4$ mentioned earlier.

Figure 3:
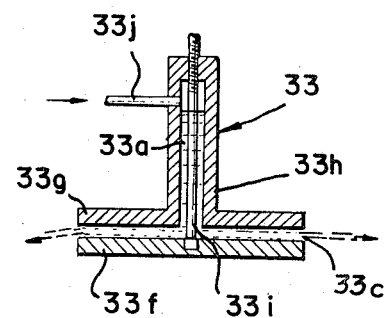
FIG. 3 is an axial cross-sectional view showing another electrode construction embodying principles of the present invention.

The electrode shown in FIG. 3 obviates the need for angular or rotary movement since it is provided with an annular orifice 33c. The orifice 33c is divided between a disk 33f and an annular flange 33q carried by the tubular shank 33h of the electrode 33. The disk 33f is held in place by a central rod 33i threadedly connected with the shank 33h so as to define therewith the annular clearance 33a into which the electrolyte is fed at 33j. It will be understood that the electrode of FIG. 3 can be used interchangeably with those of FIGS. 2, 4 and 5 whenever internal walls of bores or cavities are to be machined.

Figure 4:
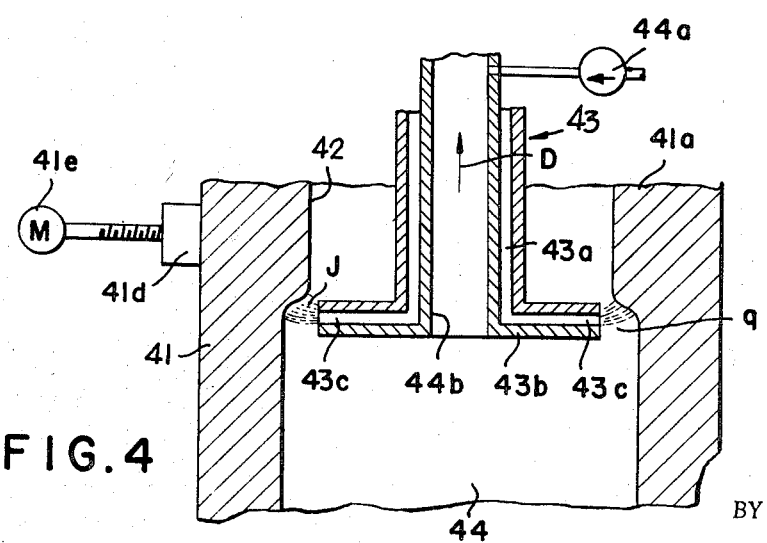
FIG. 4 is a view similar to FIG. 2 illustrating another system for machining a workpiece according to principles of the present invention.

In FIG. 4, I show still another system for machining a workpiece 41 along its internal surface 42. In this system, the electrode 43 has a disk-shaped portion 43b with radially outwardly open orifices 43c from which the jets J of electrolyte are discharged as the electrode 43 is advanced in the direction of arrow D (upwardly in FIG. 4). The electrode may thus be angularly oscillated as described with reference to the system of FIG. 2.

Behind the disk-shaped portion 43b, I provide a gas-pressure chamber 44 in which gas pressure at a level at least equal to the electrolyte pressure in the gap $q$ is maintained to force the jets J upwardly in the system, the electrolyte flowing over the upper edge 41a of the workpiece. The gas pressure is maintained by a compressor 44a which communicates with a central bore 44b extending centrally through the electrode 43 and surrounded by a coaxial passage 43a through which the electrolyte is delivered to the orifices 43c. In this case, the machining operation is confined to the zone of the jets J as the electrode is displaced upwardly and the gas pressure gate is formed below the electrode. In the systems of FIGS. 2 and 4, moreover, it is possible to rotate or angularly oscillate the workpiece as represented by the motor 41e and the worm gear arrangement 41d instead of angularly oscillating or rotating the electrode or in combination with the oscillation or rotation thereof.

Figure 5:
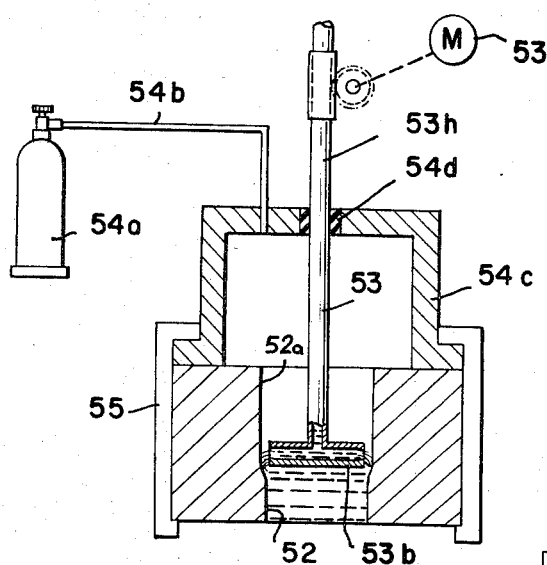
FIG. 5 is an axial cross-sectional view diagrammatically representing another pressure gate in accordance with the present invention.

FIG. 5 shows that the gas pressure gate can be formed by a pressure-retaining hood 54c which communicates with the bore 52 behind the machining portion 53b of the electrode 53 and, therefore, communicates with the previously machined portion of this bore. The shank 53h of this electrode extends axially through a pressure-retaining seal 54d in the hood 54c and can be advanced by the motor 53k (see my application Ser. No. 475,375). The gas, which can be air, nitrogen or another commonly available gas incapable of reacting to any substantial extent with the machined surface, is introduced from a tank 54a via the line 54b into the hood 54c which is clamped to the workpiece as shown at 55.

The electrolyte is thus forced forwardly in the direction of the unmachined portion 52a of the wall 52. A similar hood may be provided beneath the workpiece when the system of FIG. 4 is used. The electrode 53 may have the construction illustrated in FIG. 2 or in FIG. 3.

Figure 6:
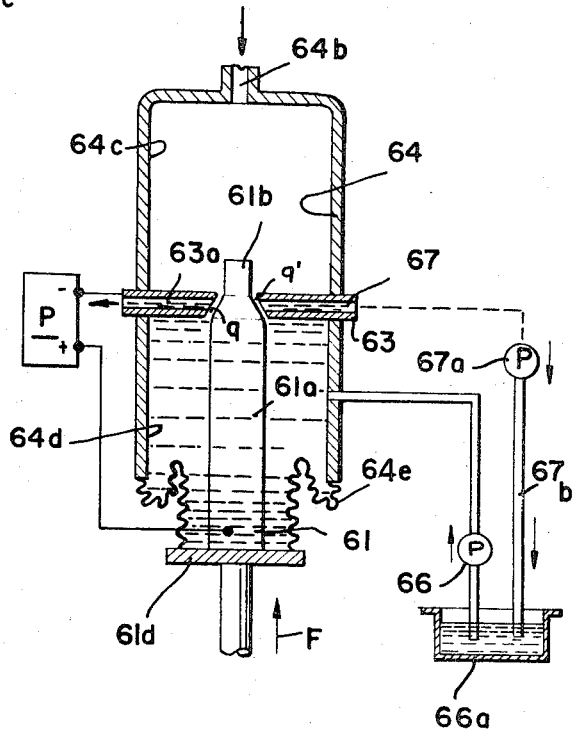
FIG. 6 is a diagrammatic axial cross-sectional view showing an electrochemical machining device for the reduction in the cross-section of an elongated body.

In FIG. 6, I have shown an electrochemical machining system for reducing the cross-section of an elongated workpiece 61. The workpiece 61, which is shifted in the direction of arrow F upon a platform 61d, has a machined portion 61b disposed upwardly of the nonmachined portion 61a. An electrochemical machining power supply P is connected between the workpiece 61 and an electrode 63 having a central opening 63a mounted in a housing 64 which is subdivided by the electrode 63 into a gas-pressure chamber 64c supplied with gas under pressure at its inlet 64b as an electrolyte chamber 64d to which the electrolyte is delivered by a pump 66 from a reservoir 66a. The electrolyte chamber 64d is sealed by a bladder 64e connected with the workpiece-support platform 61d. Electrolyte is withdrawn to the radial orifices 67 via a suction pump 67a and returned to the reservoir 66a as represented by the line 67b.

As the workpiece 61 is advanced in the direction of arrow F, electrolyte is forced under pressure through the gap q beneath the orifices 67 of the electrode 63 and electrolytic machining is thus conducted in this annular zone. Under the negative pressure of the pump 67a and the countervailing pressure of the gas in chamber 64c ahead of the electrode 63 in the direction of advance of the workpiece, electrolyte is diverted into the orifices 67 and withdrawn. At the gap q ahead of the orifices 67, the gas chamber creates a barrier preventing further machining of the workpiece in this zone. It will be understood that the pump 66 can be dispensed with when the platform 61d and the workpiece 61 are advanced at a sufficiently high rate as to displace electrolyte from the chamber 64d through the gap q.

Figure 7:
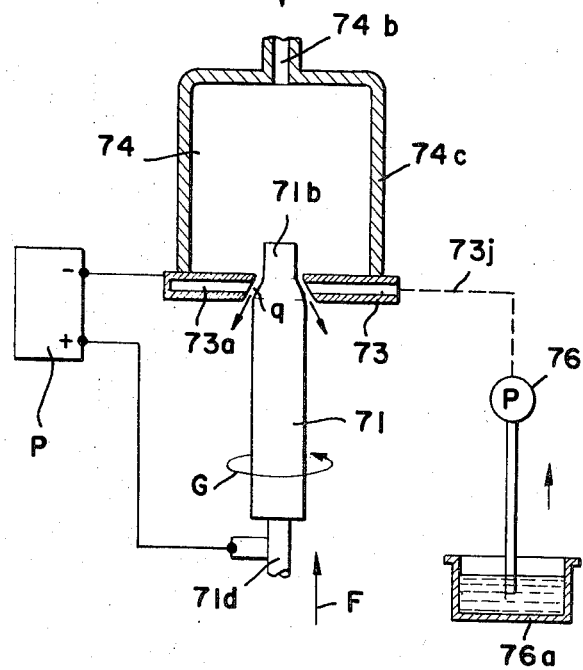
FIG. 7 is an axial cross-sectional view of an electrochemical machining lathe using the principles of the present invention.

A system generally similar to that of FIG. 6, but operating as an ECM lathe, is shown in FIG. 7 wherein the workpiece 71 is carried upon a rotating support 71d and is advanced through the electrode 73 as indicated by the arrow F. The workpiece 71 is also rotated (arrow G) to ensure uniform machining in the region of the gap q between the annular electrode 73 and the workpiece to form the small-diameter portion 71b ahead of the large-diameter or unmachined portion 71a. The electrode 73 is here shown to be provided with an annular array of radial orifices or a single annular orifice 73a trained inwardly against the workpiece and receiving electrolyte from a pump 76, a reservoir 76a and an inlet 73j. A chamber 74c forms with the electrode 73 a lock to which gas pressure is delivered via inlet 74b to prevent electrolyte from entering the gas-pressure chamber 74 in entrainment with the workpiece 71. While the system of FIGS. 6 and 7 can provide for rotation of the workpiece, it will be understood that, in each case, the workpiece may be maintained stationary while the electrode 63 or 73 is rotated. The same holds true for the embodiments of FIGS. 8 and 9.

In FIG. 8, for example, I have shown a system for the removal of peripheral surfaces of a relatively large body 81 carried by the platform 81d which is rotatable as represented by the arrow G but may be axially advanced as well (arrow F). The neck 81b on the workpiece body is formed by electrochemically machining in the electrode gap q defined by the free end of a tubular jacket 83 whose interior 84 constitutes the gas-pressure chamber to which the gas is delivered via an inlet 84b. Electrolyte is supplied along the exterior of the electrode 83 via a further jacket 83h defining the annular duct 83a with the inner member. Since the electrolyte cannot pass through the gap q between the neck 81b of the workpiece and the machining face 83b of the electrode 83, the electrolyte flows along the outer periphery of the workpiece as represented by the arrows H. A modification combining aspects of FIGS. 6 and 7 is shown in FIG. 9 wherein the gas chamber 94 terminates in the electrode structure 93 and is supplied with gas under pressure from a tank or compressor via the inlet 94b. The workpiece 91 which can be axially advanced and rotated as illustrated and described in connection with FIG. 8, is machined in the annular zone q surrounding the workpiece end within the electrode. The electrode is formed with a plurality of radial inlet orifices 93c from the duct 93a, the pump 96 and the reservoir 96a. The electrolyte cannot enter the chamber 94 because of the gas pressure therein and is turned back to the suction orifices 97 from which the electrolyte is drawn by a pump 97a and returned to the reservoir 96b. Any remaining electrolyte flows past the discharge orifices 97 as represented by the arrow H. Machining is carried out here in the manner previously discussed.

In FIGS. 10 and 10E, I show a system for forming noncircular profiles of, for example, the type illustrated in FIG. 10F which shows a turbine blade machined by electrochemical techniques. As illustrated, the substantially unprofiled blank 101 is formed with a shoulder 101c (FIGS. 10C, 10E and 10F) by urging a pair of electrode halves 103' and 103" radially inwardly (arrow K in FIG. 10B) while electrolyte is supplied to these electrode halves and discharged in the region of the machining gap q through the semiannular orifices 103a' and 103a" respectively. Material is removed without relative axial displacement of electrode and workpiece until the electrode halves 103' and 103" close around the body (FIGS. 10C and 10D), whereupon axial displacement commences in the direction of arrow F to shape the shank 101d of the turbine blade. At a location close to the far end, electrochemical machining is terminated and the electrode 103', 103" separated to leave a final gap 101e. The electrode halves are connected to a flexible bellows structure 108 forming an extension of the gas chamber 104 to which gas is supplied at inlet 104b at a pressure sufficient to prevent any electrolyte migration along the previously machined shank of the turbine blade. Excess electrolyte thus flows in the direction of arrow H during this phase of the machining process.

The improvement described and illustrated is believed to admit of many modifications within the ability of persons skilled in the art, all such modifications being considered within the spirit and scope of the invention except as limited by the appended claims.

I claim:
1. A method of electrochemically machining a conductive workpiece forming a workpiece electrode, comprising the steps of juxtaposing a tool electrode with a surface of the workpiece electrode across a machining gap; supplying an electrolyte to said gap; applying an electrolytic machining current to said electrodes to solubilize material from said surface opposite said tool electrode; relatively displacing said tool electrode and said workpiece electrode to continuously machine successive portions of the workpiece surface behind a previously machined portion; and confining the electrochemical erosion of said surface to a zone behind said previously machined portion by maintaining in the region of the previously machined portion and at the junction of said gap with the latter region, a head of gas pressure sufficient to exclude migration of electrolyte from said gap toward said region.

2. The method defined in claim 1, further comprising the step of withdrawing electrolyte from said gap between the latter and said region.

3. The method defined in claim 1 wherein said workpiece is an elongated body and said tool electrode is annular and surrounds said body, further comprising the step of rotating one of said electrodes.

4. The method defined in claim 1 wherein said electrolyte is supplied to said gap through said tool electrode.

5. An apparatus for electrochemically machining a conductive workpiece forming a workpiece electrode comprising a tool electrode juxaposable with a surface of the workpiece electrode across a machining gap; means for supplying electrolyte to said gap; a source of electrolytic machining current connectable across said electrodes; means for relatively displacing said electrodes to continuously machine successive portions of the workpiece surface behind previously machined portions thereof; and means for feeding a pressurized gas to the region of the previously machined portion of the workpiece and at the junction of said gap with said region to exclude migration of electrolyte from said gap toward said region and to confine electrochemical erosion of said surface to a zone behind said previously machined portion.

6. The apparatus defined in claim 5 wherein said workpiece electrode is a body having an annular surface and said tool electrode has an annular machining portion in all-around juxtaposition with the workpiece, said means for displacing said electrodes including means for axially shifting one of said electrodes relatively to the other of said electrodes.

7. The apparatus defined in claim 6 wherein said means feeding said gas-pressurized gas comprises a pressure chamber open in the direction of said gap and surrounding said region, the previously machines surface being increasingly exposed to the gas pressure in said chamber upon realtive displacement of said electrodes.

8. The apparatus defined in claim 7 wherein said workpiece is formed with a pilot hole and said electrode includes a piston-like member defining a wall of said chamber and forming said gap with said workpiece.

9. The apparatus defined in claim 8 wherein said electrode is formed with at least one passage communicating with said gap and means for delivering said electrolyte to said passage.

10. The apparatus defined in claim 9, wherein said tool electrode is formed with at least one further passage opening at said gap, and means for withdrawing electrolyte from said further passage.

11. The apparatus defined in claim 9 wherein said electrode is formed with a further passage communicating with said chamber and means for supplying gas under pressure to said chamber through said further passage.

12. The apparatus defined in claim 7 wherein the workpiece is an elongated body and said tool electrode is annular and surrounds said body.

13. The apparatus defined in claim 12, further comprising means for rotating said workpiece relatively to said tool electrode about a common axis of said electrode.

14. The apparatus defined in claim 12 wherein said electrode is formed with at least one passage opening radially inwardly toward said gap, said means for supplying electrolyte to said gap communicating with said passage.

15. The apparatus defined in claim 12 wherein said electrode forms a wall of said chamber.

16. The apparatus defined in claim 12 wherein said electrode comprises at least two parts, further comprising means enabling displacing of said parts transversely to said surface for machining said workpiece to a predetermined depth prior to the said realtive displacement of said electrodes.

References Cited
UNITED STATES PATENTS

| | | | |
|---|---|---|---|
| 3,345,281 | 10/1967 | Falls | 204—224 |
| 3,202,598 | 8/1965 | Covington et al. | 204—224 |
| 3,219,564 | 10/1965 | Wilkinson | 204—224 |

HOWARD S. WILLIAMS, Primary Examiner

S. S. KANTER, Assistant Examiner

U.S. Cl. X.R.

204—224